(12) United States Patent
Reiman

(10) Patent No.: US 10,791,154 B2
(45) Date of Patent: Sep. 29, 2020

(54) HOLDING REGISTRATION MESSAGES DURING COMMUNICATION SESSION SWITCHING

(71) Applicant: Edgewater Networks, Inc., Santa Cruz, CA (US)

(72) Inventor: Michael P. Reiman, Santa Cruz, CA (US)

(73) Assignee: Edgewater Networks, Inc., San Jose, CA (US)

( * ) Notice: Subject to any disclaimer, the term of this patent is extended or adjusted under 35 U.S.C. 154(b) by 58 days.

(21) Appl. No.: 16/265,922

(22) Filed: Feb. 1, 2019

(65) Prior Publication Data

US 2019/0253462 A1 Aug. 15, 2019

Related U.S. Application Data

(60) Provisional application No. 62/625,326, filed on Feb. 1, 2018.

(51) Int. Cl.
*H04L 29/06* (2006.01)

(52) U.S. Cl.
CPC ...... *H04L 65/1073* (2013.01); *H04L 63/0876* (2013.01); *H04L 65/1006* (2013.01); *H04L 65/1069* (2013.01); *H04L 65/1096* (2013.01)

(58) Field of Classification Search
CPC .................. H04L 65/1073; H04L 65/1006
USPC .......................................................... 370/252
See application file for complete search history.

(56) References Cited

U.S. PATENT DOCUMENTS

| 2006/0182255 | A1* | 8/2006 | Luck, Jr. | ............. | H04M 7/0084 |
| | | | | | 379/220.01 |
| 2008/0095114 | A1* | 4/2008 | Dutta | ................ | H04W 12/0602 |
| | | | | | 370/331 |
| 2013/0333002 | A1* | 12/2013 | Belton | .................. | H04L 63/101 |
| | | | | | 726/5 |

FOREIGN PATENT DOCUMENTS

WO WO-2017024671 A1 * 2/2017 ............ H04W 36/14

* cited by examiner

*Primary Examiner* — Peter G Solinsky
(74) *Attorney, Agent, or Firm* — Brooks, Cameron & Huebsch, PLLC

(57) ABSTRACT

Devices, methods, systems, and computer-readable media for holding registration messages during communication session switching are described herein. One or more embodiments include a processor and memory on the IP network device wherein the processor executes executable instructions stored in memory to receive an authorization message from a host provider device, authorizing an end device to communicate through the host provider device, wherein the authorization message includes an authorization refresh timer quantity, modify the authorization refresh timer quantity from a first quantity to a second, smaller quantity, send the authorization message with the modified authorization refresh timer to the end device, receive a register message, hold the register message, and when a network switch event occurs, forward the held register message to the host provider device.

25 Claims, 8 Drawing Sheets

US 10,791,154 B2

HOLDING REGISTRATION MESSAGES DURING COMMUNICATION SESSION SWITCHING

TECHNICAL FIELD

The present disclosure relates to methods, devices, systems, and computer-readable media for holding registration messages during communication session switching.

BACKGROUND

Many organizations use a Voice Over Internet Protocol (VoIP) communication system to communicate rather than a traditional telephone communication system. As with all communication systems, the ability to connect the parties wanting to speak to each other over a VoIP system and to maintain that connection, during their intended communication period, is important. Some keys to maintaining the connection are detecting that a primary connection is failing, performing a switch to an alternative pathway for the communication, and making a smooth transition for the connection to minimize disruption of the exchange between the parties or their ability to make a connection, if they are not currently on one.

Some systems utilize a redundant link that can be switched to if a primary link is having difficulty maintaining the connection or the quality of the connection which is affecting the parties' ability to communicate with each other. Reconnection may be required in some instances.

In some such systems, the primary and redundant links can be used by a IP network device, for example, having two or more public wide area network (WAN) data links, one for a primary connection and one or more for redundancy, in case the primary link becomes unreliable or inaccessible.

When setting up a communication session between two parties, the device of the party desiring to make the connection provides user authentication information to the network on which the party will use to connect to the other party. Once this authentication information is confirmed, the network will initiate setting up the call with the device of the other party or network devices on their network.

One issue with redundant systems is that when a connection is interrupted, the device will not have instructions to resend the credentials to the new network and the host provider of the communication and may not allow the device to re-register for a predefined period. In such an instance, the device may not be able to establish a communication session for a long period (e.g., a half hour). As discussed above, these traditional solutions are often too slow to work in the VoIP field.

Additionally, re-authentication of a user requires their registration credentials which are sensitive information that a user or provider of communication services does not want disclosed. Accordingly, in order to maintain the secrecy of this information, the end device (e.g., phone of the user intending to establish the communication session) sends a message that includes encrypted credential information to be unencrypted by the host provider (e.g., phone service company, network provider) device. This secrecy means the IP network device (device that is an intermediary device that facilities the connection between the end device and host provider device) does not have the ability to access this information at the time of switching networks and, therefore, needs to get the information from the end device.

DETAILED DESCRIPTION

Figure 1:
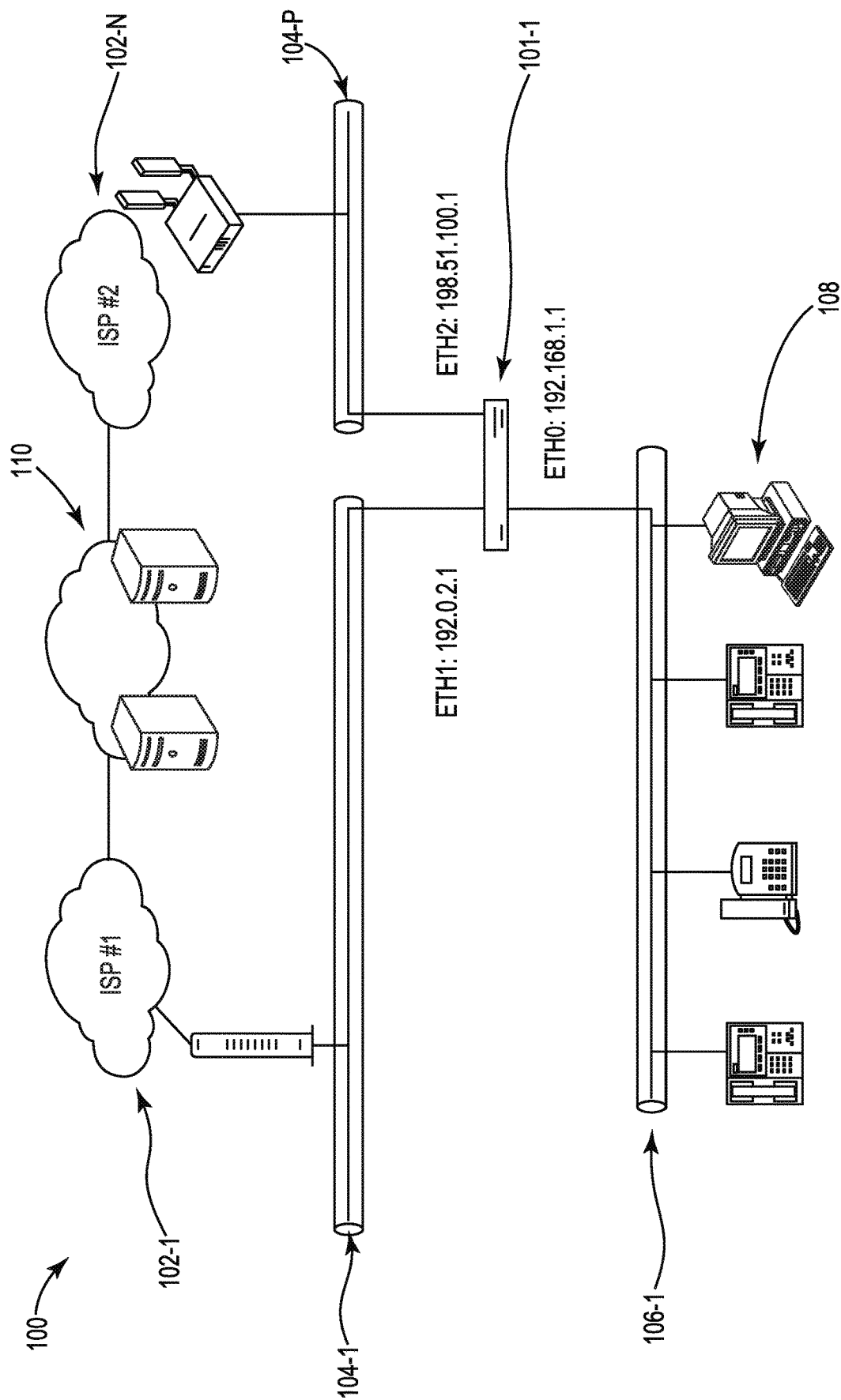
FIG. 1 illustrates an example of a system for use in determining the health of network links to an IP network device according to one or more embodiments of the present disclosure.
Figure 2:
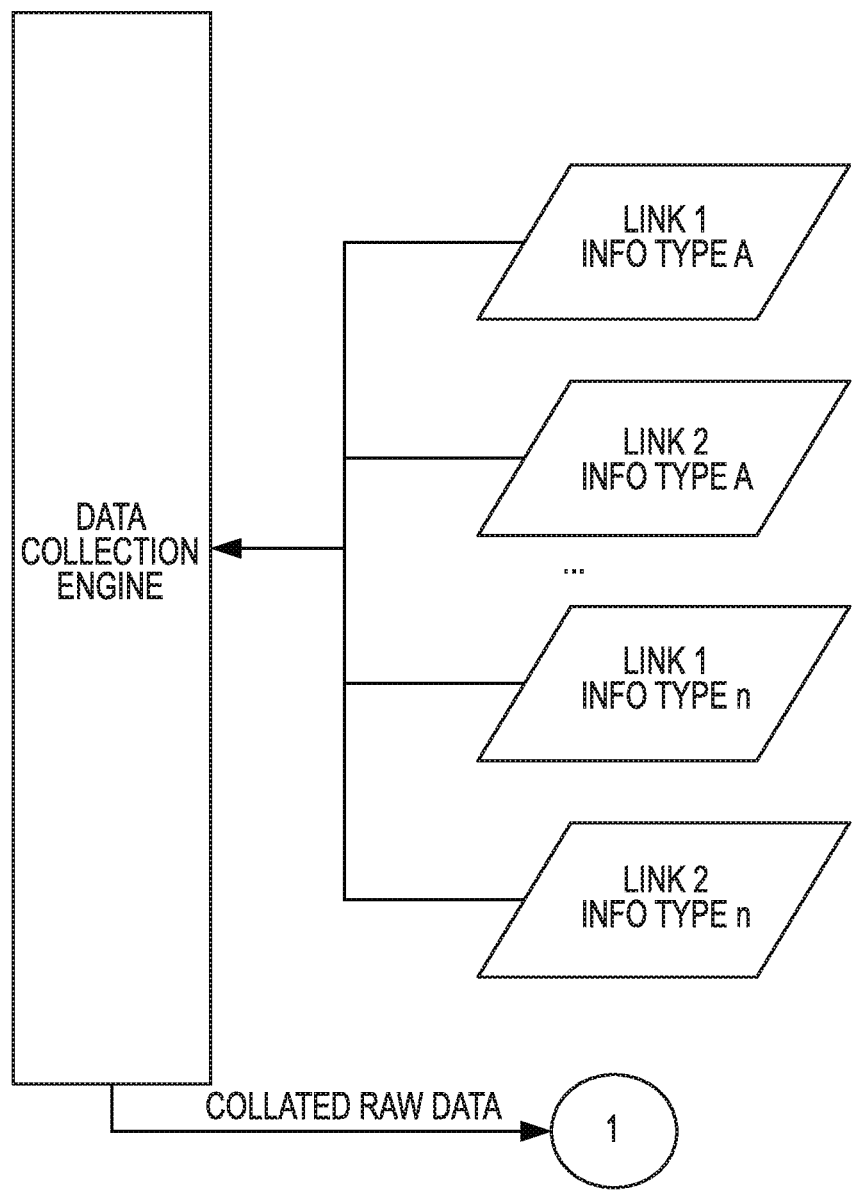
FIGS. 2-7 illustrate a decision tree chart that provides an example of how the functionalities of the system can be accomplished according to one or more embodiments of the present disclosure.
Figure 3:
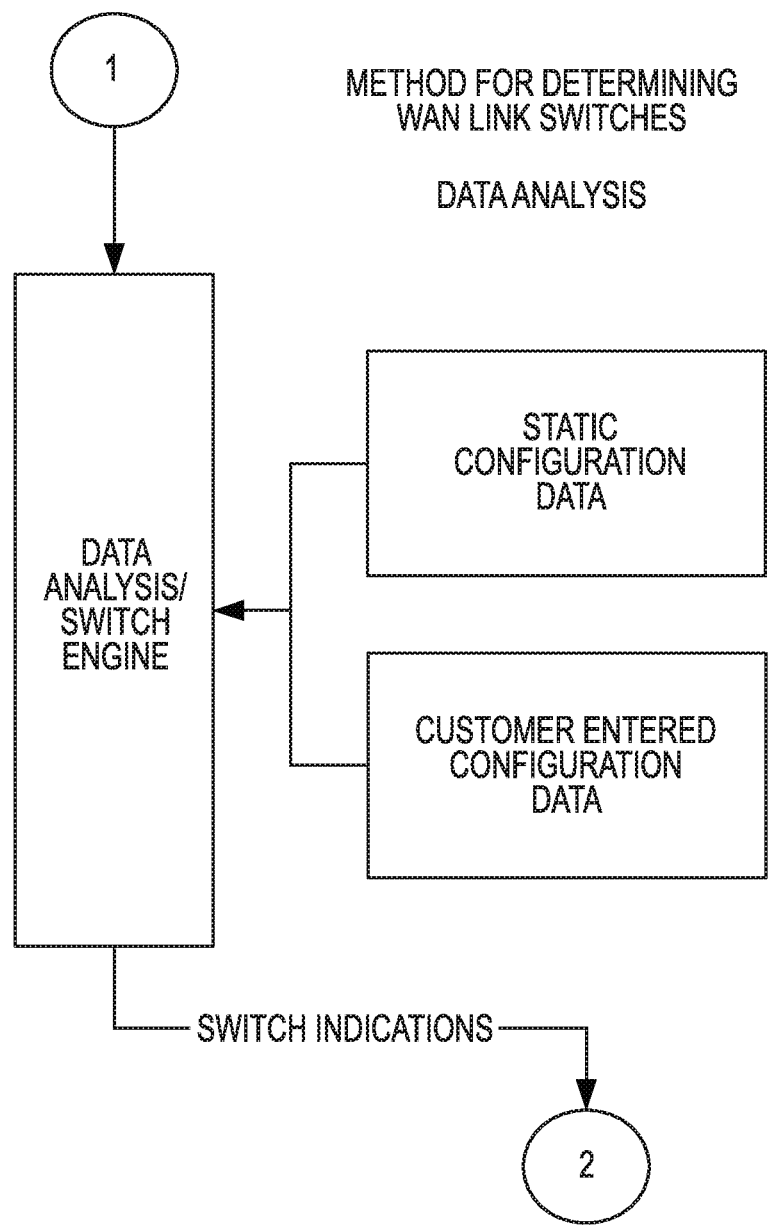

The embodiments of the present disclosure provide methods, systems, devices, and computer-readable media for holding registration messages during VoIP switching for network impairment on redundant IP networks. Such an implementation allows the system to switch the communication path more seamlessly, which can be beneficial in making the user experience more pleasant by making the communication on the system more fluid, among other benefits.

As discussed herein, this concept can be accomplished as part of communication switching process, for example, during a network switching event procedure in a communication system. The process involves holding a portion of the registration dialogue at the IP network device for later use when a communication session or service with a host provider is interrupted.

As used herein, a host provider is an entity that provides a communication service between devices on a network. For example, a host provider would be a telephone carrier, a VoIP provider, a mobile communications device service provider, and other such service providers. An IP network device is a device that works between an end device and a device of the host provider to establish a connection between a first party using the end device and a device of a second party that is intended to be connected via the host provider to the end device of the first user for purposes of allowing the first and second parties to communicate.

In the following portion of the detailed description, reference is made to the accompanying figures that form a part hereof. The figures show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

Also, as used herein, "a" or "a number of" something can refer to one or more such things. For example, "a number of operations" can refer to one or more operations.

The present disclosure also uses the letters N and P to along with the numbers in the figures to illustrate that those items can have any number of such items above the number previously used to describe that item. For example, 102-1 and 102-N are used which means that N can represent any number larger than 1. Accordingly, N could represent the $2^{nd}$ such item, the $5^{th}$ such item, the $1000^{th}$ such item, etc.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

FIG. 1 illustrates an example of a system for use in determining the health of network links to an IP network device according to one or more embodiments of the present disclosure. In the embodiment illustrated in FIG. 1, the system 100 includes a number of IP network devices (e.g., VoIP network devices) 101-1, a number of networks 102-1 and 102-N (WAN networks), a number of network links 104-1 and 104-P, a local network 106-1, a number of end communication devices 108 that a party may use to communicate with another party over the IP network connection, and a number of intermediary service devices (e.g., one or more routing devices) 110 that provide a pathway to allow the passing of packets between networks 102-1 and 102-N. In this example, the intermediary devices 110 are operated by the host provider.

As can be seen from the illustration in FIG. 1, an IP network device 101-1 is a computing device that is connected to links to several networks. For instance, link 104-1 allows connection to network 102-1 (e.g., a cable provider network) and a unique IP address is provided to identify the device 101-1 with respect to that network. Link 104-P allows connection to network 102-N (e.g., a mobile telephone network) and a unique IP address (different from that used for network 102-1) is provided to identify the IP network device 101-1 with respect to that network. Additionally, IP network device 101-1 is also connected to a local network (LAN) through link 106-1 and a unique IP address (different from those used for networks 102-1 and 102-N) is provided to identify the IP network device 101-1 with respect to that network.

The IP network device includes a processor that can execute instructions that are stored in memory, for example, on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory and/or the processor may be located on the IP network device 101-1 or off of the computing device, in some embodiments. As such, as illustrated in the embodiment of FIG. 1, the IP network device 101-1 can include a network interface having input and/or output capabilities. Such an interface can allow for processing on another networked computing device and/or can be used to obtain data and/or executable instructions for use with various embodiments provided herein.

In order to make a connection between a first party (using an end device 108) and a second party (whose end device is not shown), a communication request is initiated by the end device 108 the user is using to connect to the second party. The communication request is sent to the IP network device 101-1. The selection of which device 101 to send the request to can be determined automatically, for example, based on a preference stored in memory of the end device or by another suitable selection mechanism.

If 101-1 is selected, the IP network device receives the request and forwards it to a host provider device. The host provider device keeps track of subscribers to their system that can access the system for communication with other (e.g., VoIP phone system customers).

If the user is authorized to use the system, then the host provider device 110 passes the request on to the host provider device of the second user and they pass it on to the end device of the second user for establishment of the communication session between the parties. To make sure that the user is authorized to use the system, the host provider device may ask for credentials (e.g., user name and password) that it can check against customer credential information saved in memory. This process will be discussed in more detail below.

FIGS. 2-7 illustrate a decision tree chart that provides an example of how network switching event functionalities of a system can be accomplished according to one or more embodiments of the present disclosure. This example is just one possible network switching event process and is provided herein to give context to the holding registration messages invention described herein.

In this network switching event example, the DCE on the left side of the chart collects the indication of fault information for two links (i.e., link 1 and link 2, though as discussed herein, there could be many links from multiple sources (designated by info link type A-n). This indication of fault information is received by the DCE where it can be used to make a decision about whether a link needs to be switched. In some instances, raw data is sent out of the DCE toward Circle #1 which feeds it into a data analysis/switch engine (these tasks could be all handled by one application on a computer) on FIG. 3.

In some embodiments, the data analysis/switch engine receives static configuration data and/or customer entered configuration data. The static configuration data can be programmed, for example, by the manufacturer of the IP network device. The information provided are items like what types of indications should be valued with respect to determining (e.g., layer 1, layer 2, but not layer 3; physical layer, network layer, but not transport layer; assign a hierarchy of indications or weighted value assignments). The customer entered configuration data can be provided by any user of the system (e.g., network administrator, first party to the communication that is being established).

Figure 4:
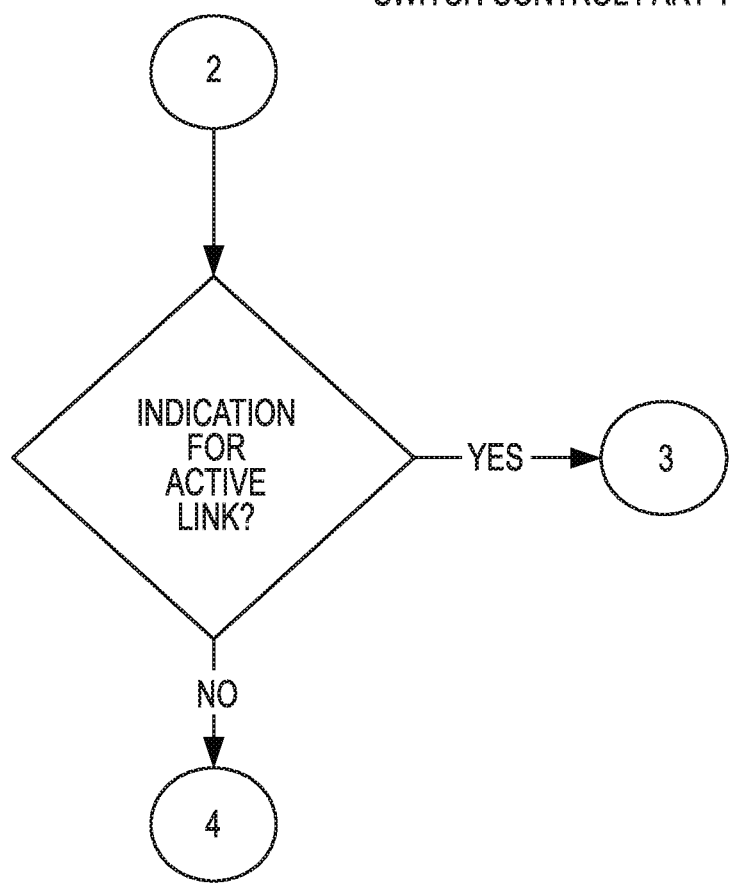

Once the analysis has been completed and a determination as to whether a switch of networks should occur, one or more switch indications is sent from the data analysis/switch engine toward Circle #2 which feeds it into a switch controller in FIG. 4. As shown the switch controller can look at the condition of the active link by assessing whether the switch indication received from the data analysis/switch engine is for the active link (current network).

Figure 5:
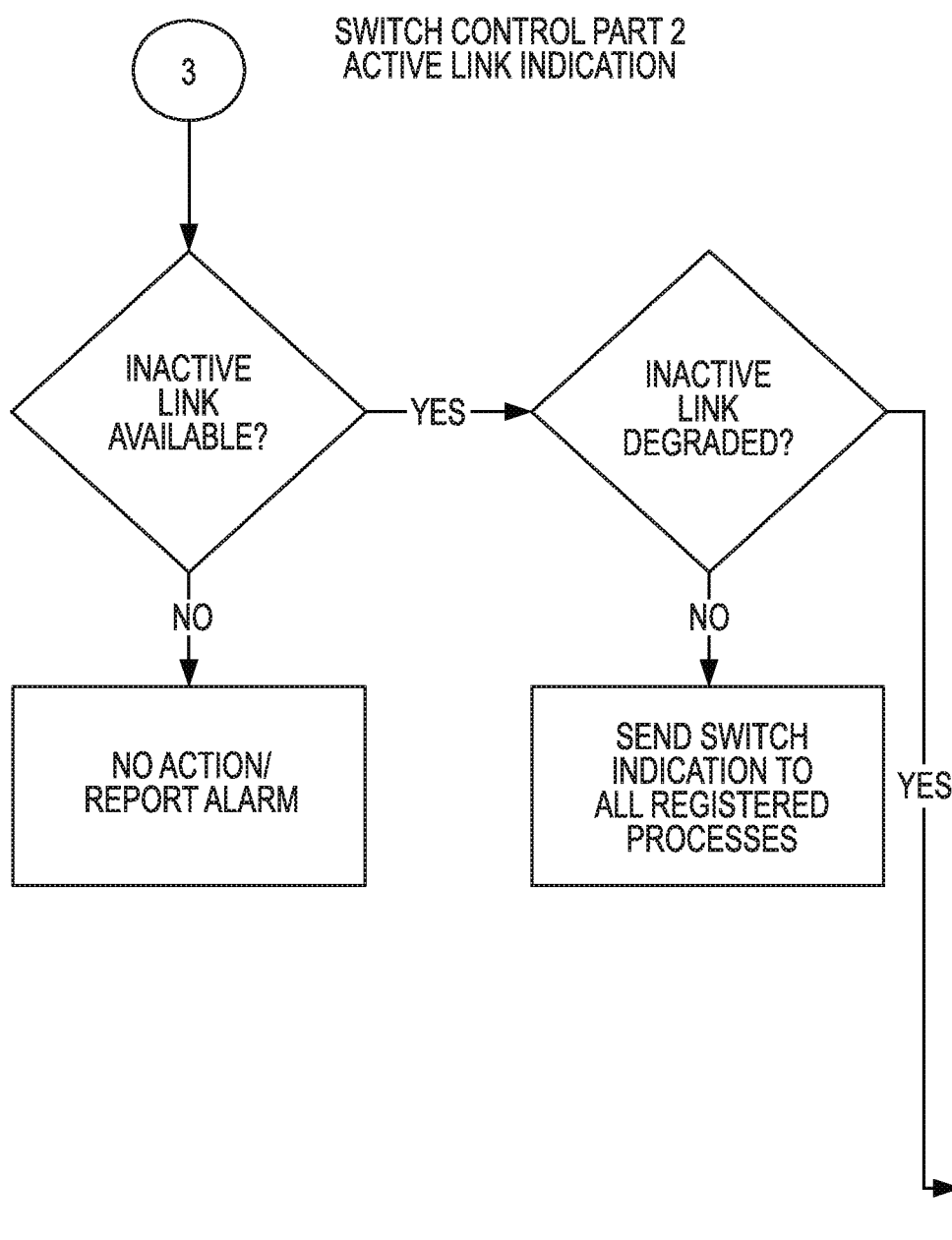

If the indication is for the active link, then the decision tree moves to FIG. 5. This path indicates that the active link needs to be switched. In response to this indication, the switch from current to backup can be made.

However, in the embodiment of FIGS. 2-7, the availability of the inactive link (backup network) is checked to make sure that the switch does not take the connection from a bad one to a worse one. In FIG. 5, the inactive link is checked and if it is unavailable (inoperable or degraded below a threshold level) at which point the switch controller trips an alarm to let the user/administrator know that the backup is not available and its status needs to be reset so that it is available when needed.

If the inactive link is available, then the system checks to see if the inactive link is degraded. If it is not, then the system sends a switch indication to all registered processes, so they can begin migrating to the new primary link. If the inactive link is degraded, the decision tree moves toward Circle #5 which feeds into a switch controller in FIG. 7.

Figure 6:
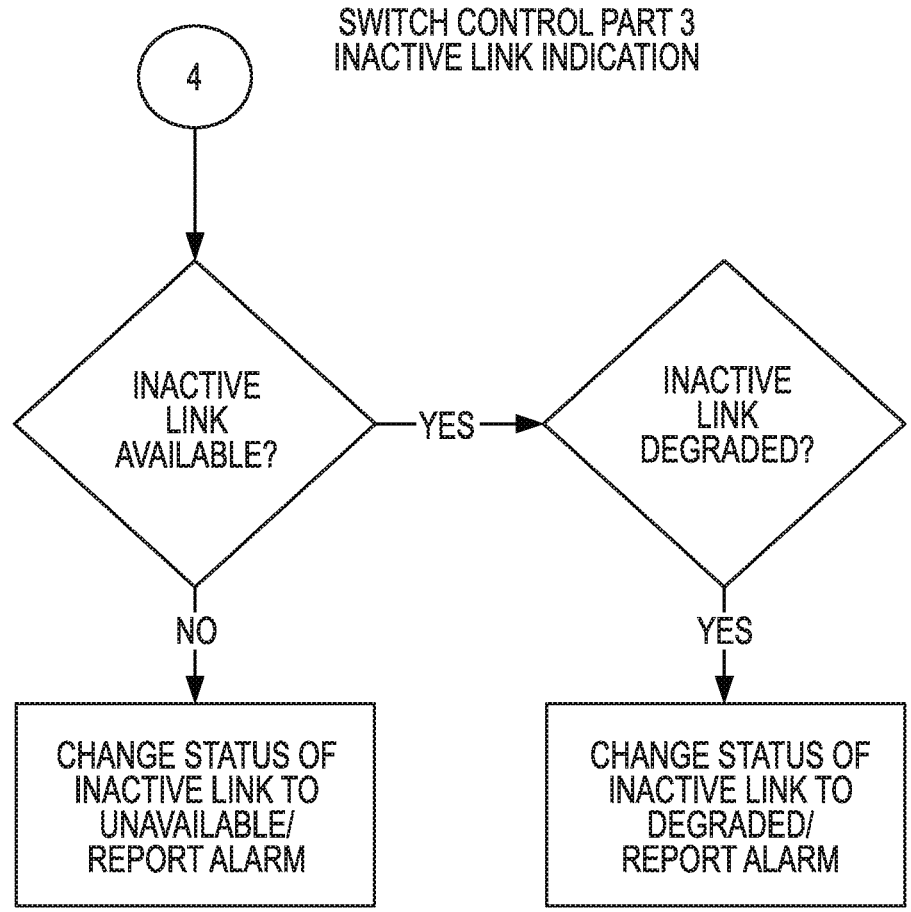

Returning to FIG. 4 regarding the second possible decision regarding the active link, if the switch indication is not for the active link, then the decision tree moves to FIG. 6. In this Figure, the system still checks the status of the inactive link.

If the inactive link is available, then the system checks to see if the inactive link is degraded. If it is degraded, then the system changes the status (e.g., a flag at a memory location) of the inactive link to—degraded and a report and/or alarm is generated. If the inactive link is not available, then its status is changed to unavailable and a report and/or alarm is generated.

Figure 7:
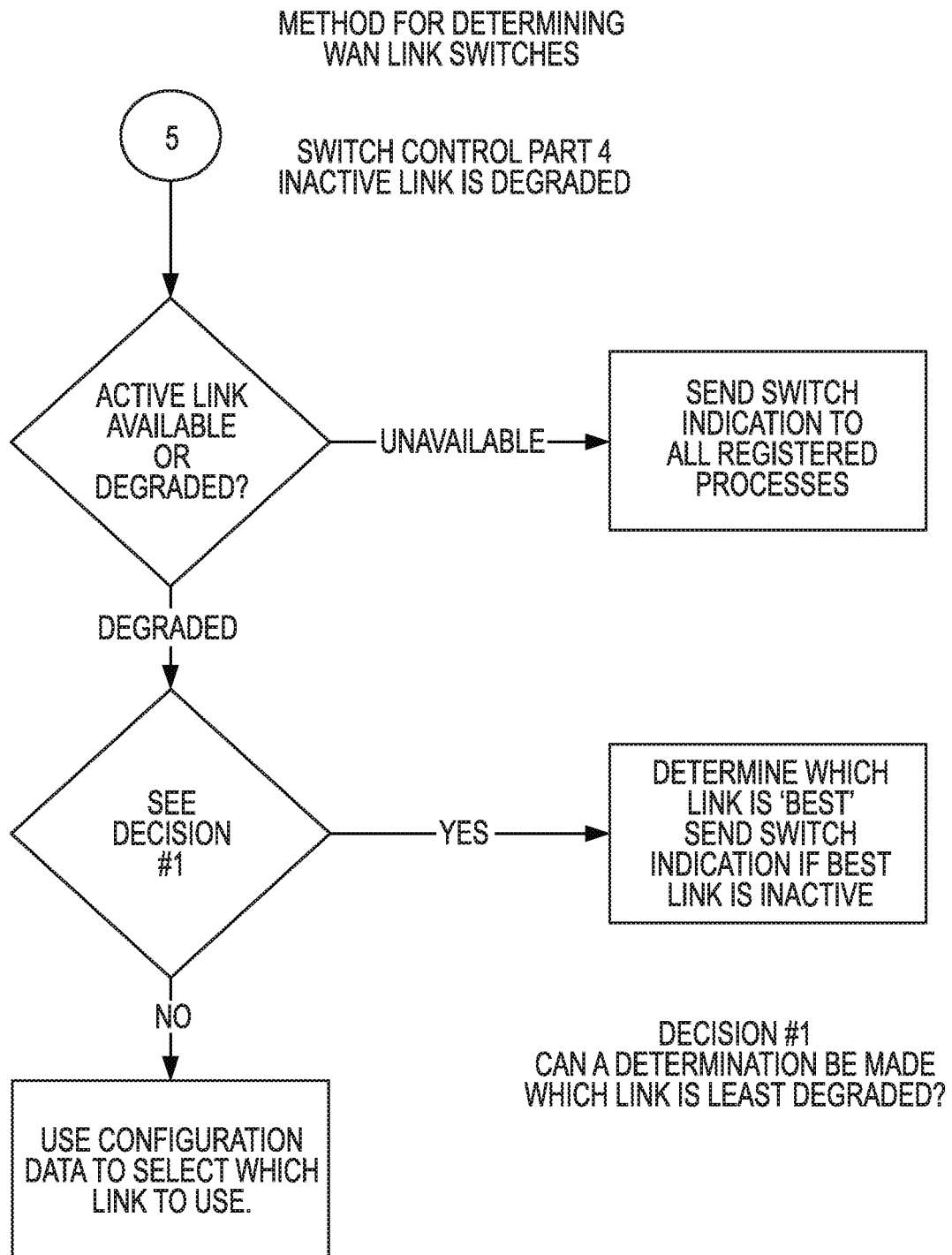

In FIG. 7, the system checks to see whether the active link is available or degraded. If unavailable, the system sends switch indications to all registered processes. If the active link is degraded (over a threshold value/percentage) then, in some embodiments a determination can be made as to which link is least degraded.

A determination can also be made in some embodiments how costly the connection will be. This can be beneficial when one network is much more costly than the other network. In some instances, cost and operability can be evaluated together to determine which link is the best under those circumstances.

If the determination of which link is the best can't be made, then user configuration data (preferred cost, bandwidth, network type) can be used to select the link. In some embodiments, this analysis can be done periodically, so that it does not need to be done.

Figure 8:
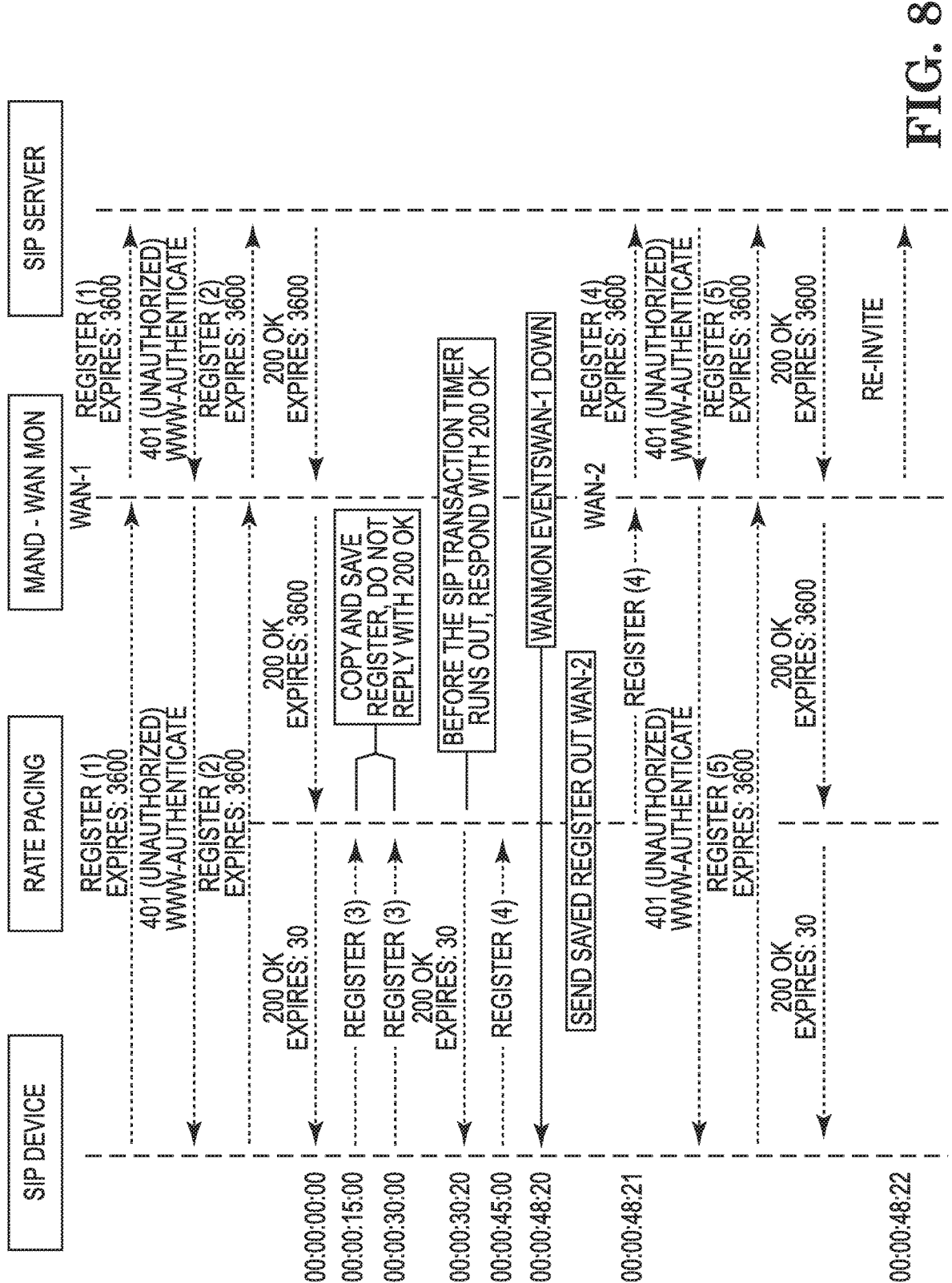
FIG. 8 illustrates a registration message holding process according to one or more embodiments of the present disclosure.

FIG. 8 illustrates a registration message holding process according to one or more embodiments of the present disclosure. FIG. 8 includes an SIP device (end device 108 in FIG. 1), an IP network device including a rate pacing functionality to speed the rate of responses between the SIP device and the SIP server and a network monitoring functionality (MAND-WAN MON), and an SIP server (intermediary server 110 of FIG. 1).

On a system having network redundancy, when switching occurs, such as via the process illustrated in FIG. 2-7 or via some other switching process, the new connection needs to be established between the IP network device and the new network. To do this, the user's end device (e.g., 108) needs to be authorized to use the network. This requires some registration credentials to be passed from the end device 108 via the IP network device (e.g., 101-1) to a host provider device (e.g., 110) that checks the credentials and approves access to those devices that have been authorized to use the network.

In order to make sure that the host provider's customers are the users of the connections created by the host provider, the host provider tracks the credentials of the users. As discussed above, these credentials are typically a user name and password that is set by the user and associated with the account for the user with the host provider.

The host provider typically associates this information with an identifier and an IP address that the user is associated with when contacting the host provider. When a communication session is being initiated, the host provider collects this information from the user's end device, provided via the IP network device, and checks its records (credential information stored in memory by the host provider) to make sure the user is authorized to communicate on their network.

Once the authorization is complete, the user does not have to resubmit their credentials, but does need to periodically send a short message to re-authorize them for another period (e.g., 1 hour). In order to do that in a timely manner so that the end device does not need to do the authorization process again, the end device responds in a time shorter than the set period (e.g., 1 hour minus 5 minutes).

However, when a communication session is switched from a primary network (e.g., 102-1) to a secondary network (e.g., 102-N), the re-authorization needs to happen immediately, but the end device is not aware that the switch has occurred and so does not initiate the re-authorization process. Accordingly, it may wait until the next response time is up before initiating the message to re-authorize. If the switch happens at the beginning of the period (e.g., 1 hour) it may be a long time (e.g., nearly an hour if the period is an hour) before the re-authorization occurs.

The disconnect between the end device and the host provider device is caused because the IP address that is associated with a user's end device changes (e.g., when using ISP #1's network, the device 101-1 is associated with IP address 192.0.2.1 in FIG. 1, but when it switches to ISP #2 the device 101-1 is associated with IP address 198.51.100.1 as viewed from host provider device 110). When this occurs, the host provider no longer knows who the end device 108 is associated with as the information received does not match that of the credentials the host provider device has stored in memory for that end device. This is because the OSI model layer 3 source transport IP address is different than what the host provider has associated with the end device.

As discussed above, the registration credentials are known to the end device (108), but not known to the IP network device (101-1) and are typically passed to the host provider device (110) in an encrypted format. They are typically encrypted to keep the security information used by the host network securely maintained between the customer and host provider, reducing the ability of hackers to access that information from a third party, such as the IP network device.

In such implementations, the IP network device cannot save a copy or otherwise access the credentials. Although such a process is helpful for security purposes, reconnection during a network switching event can be problematic as the re-authorization process needs that credential information that would usually be encrypted.

Accordingly, to get this encrypted information to the host provider device during a network switching event, the end device needs to be prompted to send it. However, in current systems, there is no way to get the end device to send the credential information at a time earlier than the predefined re-authorization time period (e.g., the 1 hour minus 5 minute time discussed as an example above) and so the end device continues to wait until the end of the predefined period.

However, embodiments of the present disclosure hold information about the re-authorization process prior to an event needing to switch networks and as such has the information to prompt the end device when the switch occurs. This is accomplished, for example, by saving a registration message (containing credential information therein), at the IP network device, when it is sent during a normal registration process.

For instance, as shown in FIG. 8, at the top of the flow chart, a SIP device (end device 108) sends a register message (register (1)) indicating that it wants to use the host provider (e.g., user identifier). This message is received by the IP network device (providing the rate pacing and MAND-WAN MON functionalities shown in FIG. 8). This register message is then forwarded to the host provider device (SIP server). Since the SIP device is not authorized yet, the SIP server (host provider device 110) returns an unauthorized user message with a request to authenticate.

In response, the SIP device sends a second register message with the registration credentials needed to authorize the user on the network (e.g., user name and password). As discussed above, in many embodiments, the second registration message contents are encrypted and cannot be accessed by the IP network device.

This second registration message (register (2)) is received by the IP network device. The IP network device, then, forwards the second registration message on to the SIP server and proceeds to decrypt the message and check the credential information contained in the second registration message with the credential information the host provider has about the user and their access rights to use the host provider's network/services.

Once authorization is confirmed, the SIP server responds with an acknowledgement message that the user is authorized (200 OK message). As can be seen by the flow of FIG. 8, all of the messages passed between the SIP device and SIP server are passed via the IP network device (e.g., 101-1) that acts as an intermediary between the SIP device and the SIP server.

As discussed above, in the normal re-authorization process, before the expiration of a predetermined time period (e.g., 1 hour), the SIP device needs to send a register message within that time period that includes required credential identification information that will allow the host provider to re-authorize the SIP device for a new time period (e.g., another 1 hour period). In the embodiment of FIG. 8, the rate pacing functionality of the IP network device changes the time period within the acknowledgement message from 3600 seconds to 30 seconds. It should be noted that the time period can be changed to any suitable time period.

This changed message is then sent to the SIP device which then begins to respond within 30 seconds rather than within 3600 seconds. The SIP device then schedules to send a re-authorization register message within the new shortened time period. It does so at 15 seconds (00:00:15:00) as indicated at the left of the chart, however, this time can be any suitable time before the expiration of the 30 second time period). The next register message is sent at line 5 and instead of forwarding the register message to the SIP server, the IP network device holds onto it and writes it in memory.

It continues to receive register messages from the SIP device and does not forward them to the SIP server until the 3600 second time period is close to expiration. It then sends a register message to the SIP server to re-authorize the SIP device for another 3600 second period and the above process can be repeated.

One example of an instance in which embodiments of the present disclosure are useful is when a network switching event occurs (e.g., such as when a network connection fails and a failover event (moving a communication session to another network connection) occurs). Such an instance is described in FIG. 8.

In FIG. 8, at line 9, the IP network device identifies that the primary network (e.g., 102-1) is having a problem (e.g., via its MAND-WAN MON functionality) and the system needs to switch from a primary network to a secondary network (e.g., 102-N). The IP network device then sends the saved register message out to the SIP server via the secondary network.

Since there is a mismatch in the information about the user (due to the register message coming from a different network than the host provider expects based on the user credential information it has saved), it sends an unauthorized user message (at line 11 of FIG. 8) to the SIP device and asks for the SIP device to re-authenticate itself. Accordingly, the SIP device sends a new register message (line 12) with the registration credentials for the SIP server to review for re-authentication.

And, once approved, the SIP server returns an acknowledgement (200 OK) at line 13 of FIG. 8. The IP network device then asks the SIP server to re-invite the device of the second party, if a second party was connected to the first party at the time of the problem on the primary network. In some embodiments, this network switching event process can be transparent to the two parties that are connected.

In this manner, the embodiments of the present disclosure can transition an end user from one network to another without substantial interruption in the function of the network from the user's perspective. The embodiments do so without any alterations to the user's end device and, therefore, can be used with user devices from any manufacturer.

Provided below are some example embodiments of the present disclosure. As noted in the claims section of this disclosure, embodiments include devices, systems, methods, and computer readable medium and can include various features disclosed herein, such as those shown below.

A first example is an IP network device for holding registration messages including a processor and memory on the IP network device. The processor executes executable instructions stored in memory to, for example, receive an authorization message from a host provider device, authorizing an end device to communicate through the host provider device, wherein the authorization message includes an authorization refresh timer quantity, modify the authorization refresh timer quantity from a first quantity to a second, smaller quantity, send the authorization message with the modified authorization refresh timer to the end device, receive, from the end device, a register message, hold the register message, and when a network switch event occurs, forward the held register message to the host provider device. In this manner, the IP network device can have the credential information needed to perform a re-authorization, without compromising personal information of the user or host provider.

In some embodiments the device can also include executable instructions to receive a re-authorization request from the host provider device after the held register message is forwarded to the host provider device, forward the re-authorization request to the end device, receive, from the end device, a re-authorization register message having a set of identification credentials, forward the re-authorization register message to the host provider device, receive a re-authorization confirmation from the host provider device, and forward the re-authorization confirmation to the end device. In this manner, the device can quickly re-authorize the end device such that communication can be utilized on the device.

The register message can be held for any suitable period of time for accomplishing the re-authorization. For example, instructions can also execute to hold the register message for a predetermined period of time (e.g., a time period that is less than the authorization refresh timer quantity as discussed above).

The register message can be held in any suitable manner. For example, instructions can execute to hold the register message by writing the message in memory on the IP network device. Additionally, or alternatively, instructions can be executed to hold the register message by copying the message to a buffer on the IP network device.

As it is not necessary for the IP network device to hold all of the register messages, others can be discarded. For example, instructions can be executed to hold a first register message and discard additional register messages without forwarding them to the host provider device. In this context, the term first simply refers to the one being held rather than a first item in a sequence of items and, therefore, the first register message can be any register message sent to the IP network device.

In some embodiments, the instructions execute to hold the register message until near the end of the authorization refresh timer quantity. In this context, near the end of the authorization refresh timer quantity means that as described above, the register message can be held until the time for authorization is close to expiring (e.g., within 50% of the original time quantity). Then, the register message can be forwarded to the host provider device with sufficient time to allow the host provider device to complete the re-authorization process and send an acknowledgement that the end device is re-authorized.

In order to provide redundancy, the IP network device can have several components. For example, the IP network device can include one or more communication components that provide a connection to an end device for use by a first party to communicate with a second party through an IP network connection via the IP network device, a connection to a first network device operating a first network connected to the IP network device, and a connection to a second network device operating a second network connected to the IP network device. These network connections can facilitate the network switch when a primary network is not in a condition to carry a communication thereon.

In some embodiments, the first register message includes a set of identification credentials used by the host provider device to authorize the end device. As discussed above, these credentials can be personal information of the user or host provider and can be encrypted or be of another sensitive nature such that they should not be exposed to the IP network device. In such embodiments, a re-authorization register message can have a set of identification credentials therein and the credentials can be forwarded to the host provider device.

As discussed above, the credentials in the first register message can, for example, include user name and password. The first register message can include an IP address for the connection of the first network to the IP network device. In a similar manner, the re-authorization register message can include an IP address for the connection of the second network to the IP network device. And, the credentials in the re-authorization register message can also include user name and password.

In some embodiments, the instructions can execute to hold a subsequent register message (after a first register message) until near the end of the authorization refresh timer quantity and then forward the subsequent register message to the host provider device with sufficient time to allow the host provider device to complete the re-authorization process and send an acknowledgement that the end device is re-authorized. In this manner, the end device can be re-authorized before expiration of the time period represented by the authorization refresh timer quantity.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:
1. An IP network device for holding registration messages, comprising:
 a processor and memory on the IP network device wherein the processor executes executable instructions stored in memory to:
  receive an authorization message from a host provider device, authorizing an end device to communicate through the host provider device, wherein the authorization message includes an authorization refresh timer quantity;
  modify the authorization refresh timer quantity from a first quantity to a second, smaller quantity;
  send the authorization message with the modified authorization refresh timer to the end device;
  receive, from the end device, a register message;
  hold the register message; and
  when a network switch event occurs, forward the held register message to the host provider device.
2. The device of claim 1, wherein the instructions execute to:
 receive a re-authorization request from the host provider device after the held register message is forwarded to the host provider device;
 forward the re-authorization request to the end device;
 receive, from the end device, a re-authorization register message having a set of identification credentials;
 forward the re-authorization register message to the host provider device;
 receive a re-authorization confirmation from the host provider device; and
 forward the re-authorization confirmation to the end device.

3. The device of claim 1, wherein the instructions execute to hold the register message for a predetermined period of time.

4. The device of claim 3, wherein the predetermined time is a time period that is less than the authorization refresh timer quantity.

5. The device of claim 1, wherein the instructions execute to hold the register message by writing the message in memory on the IP network device.

6. The device of claim 1, wherein the instructions execute to hold the register message by copying the message to a buffer on the IP network device.

7. The device of claim 1, wherein the instructions execute to hold a first register message and discard additional register messages without forwarding them to the host provider device.

8. The device of claim 1, wherein the instructions execute to hold the register message until near the end of the authorization refresh timer quantity and then forward the register message to the host provider device with sufficient time to allow the host provider device to complete the re-authorization process and send an acknowledgement that the end device is re-authorized.

9. An IP network device for holding registration messages during VoIP switching for network impairment, comprising:
one or more communication components that provide:
a connection to an end device for use by a first party to communicate with a second party through an IP network connection via the IP network device;
a connection to a first network device operating a first network connected to the IP network device;
a connection to a second network device operating a second network connected to the IP network device;
a processor and memory on the IP network device wherein the processor executes executable instructions stored in memory to:
receive a registration message from the end device to register the end device with a host provider device and forward the registration message to the host provider device;
receive a challenge message from the host provider device and forward the challenge message to the end device;
receive, from the end device, a first register message and forward the first register message to the host provider device;
receive an authorization message including an authorization refresh timer quantity from the host provider device;
modify the authorization refresh timer quantity from a first quantity to a second, smaller quantity;
send the authorization message with the modified authorization refresh timer to the end device;
receive, from the end device, a subsequent register message;
hold the subsequent register message; and
when a network switch event occurs, forward the held subsequent register message to the host provider device.

10. The device of claim 9, wherein the first register message includes a set of identification credentials used by the host provider device to authorize the end device.

11. The device of claim 9, wherein the executable instructions execute to:
receive a re-authorization request from the host provider device; and
forward the re-authorization request to the end device.

12. The device of claim 11, wherein the executable instructions execute to:
receive, from the end device, a re-authorization register message having a set of identification credentials and forward the credentials to the host provider device; and
forward the re-authorization register message to the host provider device.

13. The device of claim 12, wherein the executable instructions execute to:
receive a re-authorization confirmation from the host provider device; and
forward the re-authorization confirmation to the end device.

14. The device of claim 9, wherein the authorization message authorizes the end device to communicate through the host provider device.

15. The device of claim 12, wherein the executable instructions execute to:
detect when a failover event occurs and switch from the first network to the second network.

16. An IP network device for holding registration messages during VoIP switching for network impairment on redundant IP networks, comprising:
one or more communication components that provide:
a connection to an end device for use by a first party to communicate with a second party through a VoIP network connection via the IP network device;
a connection to a first network device operating a first network connected to the IP network device;
a connection to a second network device operating a second network connected to the IP network device;
a processor and memory on the IP network device wherein the processor executes executable instructions stored in memory to:
receive a registration message from the end device to register the end device with a host provider device and forward the registration message to the host provider device;
receive a challenge message from the host provider device and forward the challenge message to the end device;
receive, from the end device, a first register message having a set of identification credentials and forward the credentials to the host provider device;
forward the first register message to the host provider device;
receive an authorization message from the host provider device, authorizing the end device to communicate through the host provider device, wherein the authorization message includes an authorization refresh timer quantity;
modify the authorization refresh timer quantity from a first quantity to a second, smaller quantity;
send the authorization message with the modified authorization refresh timer to the end device;
receive, from the end device, a subsequent register message;
hold the subsequent register message;
when a failover event occurs, forward the subsequent register message to the host provider device;
receive a re-authorization challenge request from the host provider device;
forward the re-authorization challenge request to the end device;

receive, from the end device, a re-authorization register message having a set of identification credentials and forward the credentials to the host provider device;

forward the re-authorization register message to the host provider device;

receive a re-authorization confirmation from the host provider device; and forward the re-authorization confirmation to the end device.

17. The device of claim 16, wherein the credentials in the first register message include user name and password.

18. The device of claim 16, wherein the first register message includes an IP address for the connection of the first network to the IP network device.

19. The device of claim 16, wherein the re-authorization register message includes an IP address for the connection of the second network to the IP network device.

20. The device of claim 16, wherein the credentials in the re-authorization register message include user name and password.

21. The device of claim 16, wherein the instructions execute to hold the subsequent register message until near the end of the authorization refresh timer quantity and then forward the subsequent register message to the host provider device with sufficient time to allow the host provider device to complete the re-authorization process and send an acknowledgement that the end device is re-authorized.

22. A method for holding registration messages, comprising:

receiving an authorization message from a host provider device, authorizing an end device to communicate through the host provider device, wherein the authorization message includes an authorization refresh timer quantity;

modifying the authorization refresh timer quantity from a first quantity to a second, smaller quantity;

sending the authorization message with the modified authorization refresh timer to the end device;

receiving, from the end device, a register message;

holding the register message; and when a network switch event occurs, forwarding the held register message to the host provider device.

23. The method of claim 22, wherein the method further includes:

receiving a re-authorization request from the host provider device after the held register message is forwarded to the host provider device;

forwarding the re-authorization request to the end device;

receiving, from the end device, a re-authorization register message having a set of identification credentials;

forwarding the re-authorization register message to the host provider device;

receiving a re-authorization confirmation from the host provider device; and forwarding the re-authorization confirmation to the end device.

24. A non-transitory computer-readable medium storing instructions thereon executable by a processor to:

receive an authorization message from a host provider device, authorizing an end device to communicate through the host provider device, wherein the authorization message includes an authorization refresh timer quantity;

modify the authorization refresh timer quantity from a first quantity to a second, smaller quantity;

send the authorization message with the modified authorization refresh timer to the end device;

receive, from the end device, a register message;

hold the register message; and when a network switch event occurs, forward the held register message to the host provider device.

25. The computer readable medium of claim 24, wherein the instructions execute to:

receive a re-authorization request from the host provider device after the held register message is forwarded to the host provider device;

forward the re-authorization request to the end device;

receive, from the end device, a re-authorization register message having a set of identification credentials;

forward the re-authorization register message to the host provider device;

receive a re-authorization confirmation from the host provider device; and forward the re-authorization confirmation to the end device.

* * * * *